United States Patent [19]

Bauer

[11] Patent Number: 5,473,495
[45] Date of Patent: Dec. 5, 1995

[54] COMBINATION LOAD CONTROLLER

[75] Inventor: James A. Bauer, Biltmore Forest, N.C.

[73] Assignee: Eaton Corporation, Cleveland, Ohio

[21] Appl. No.: 161,017

[22] Filed: Dec. 3, 1993

[51] Int. Cl.⁶ ..................................................... H01H 9/42
[52] U.S. Cl. .............................. 361/11; 361/58; 361/106; 361/27
[58] Field of Search ................................ 361/56, 58, 106, 361/10, 27, 11

[56] References Cited

U.S. PATENT DOCUMENTS

| | | | |
|---|---|---|---|
| 4,164,000 | 8/1979 | Woods | 361/27 |
| 4,237,508 | 12/1980 | Woods et al. | 361/27 |
| 4,413,301 | 11/1983 | Middleman et al. | 361/106 |
| 4,545,926 | 10/1985 | Fouts, Jr. et al. | 252/511 |
| 4,560,498 | 12/1985 | Horsma et al. | 252/511 |
| 4,775,778 | 10/1988 | van Konyenburg et al. | 219/549 |
| 4,780,598 | 10/1988 | Fahey et al. | 219/511 |
| 4,833,565 | 5/1989 | Bauer et al. | 361/154 |
| 5,064,997 | 11/1991 | Fang et al. | 219/505 |

FOREIGN PATENT DOCUMENTS 9100076 2/1991 WIPO.
9100375 5/1991 WIPO.

OTHER PUBLICATIONS

PCT Application Notes, Keystone Carbon Company Bulletin T-929, pp. 34-42, no date.

Primary Examiner—Todd DeBoer
Attorney, Agent, or Firm—Martin J. Moran

[57] ABSTRACT

A combination load controller for controlling application of power to a load such as a motor, has an input terminal coupleable to a power source, and an output terminal coupleable to a load. A conductive polymer and a protective, electromagnetic switch are disposed along a current path between the input and output terminals. The conductive polymer has a relatively low electrical resistance during conduction at nominal currents. The resistance of the conductive polymer increases substantially promptly upon conduction of excessive current, e.g., due to a short-circuit. In this manner the load is protected from even short bursts of excessively high, short-circuit current by the insertion of additional series resistance by the conductive polymer. The electromagnetic switch protects the line and load by opening the current path. The switch includes a current or voltage sensor coupled to a logic controller that opens the switch if over-current or under-voltage conditions persist for a predetermined period.

14 Claims, 2 Drawing Sheets

COMBINATION LOAD CONTROLLER

BACKGROUND OF THE INVENTION

1. Field of the Invention

The invention relates to the field of controlling the application of power to electrical loads, and in particular concerns a controller operable instantaneously to insert a high resistance between a load and a power line, when breaking the circuit between the load and the line.

2. Prior Art

Load controllers, such as motor starters and similar circuit breaking contactors, typically comprise a relay that upon energizing of the relay coils, closes an electrical circuit coupling a load to a power source. Often, the controller is equipped with an overload protector which opens the relay to disconnect power from the load upon occurrence of a fault condition. The fault conditions triggering opening of the circuit may be an instantaneous overcurrent or undervoltage on the line, or an average current load that exceeds a predetermined limit. Opening of the contactor relay prevents flow of excessive current that may damage either the line or the load.

The timing of the circuit breaking operation is important. In the event of a direct short circuit which sinks a very large current, the relay may be too slow to open in time to prevent damage to the load or line. Furthermore, electrical arcs associated with inductive loads or very excessive currents can weld the relay contacts shut, preventing the safety features of the load controller from opening the relay at all. Even if the relay contacts are able to open, arcing across the relay contacts erodes them. Pitting and accumulation of carbon deposits impede current flow during normal use, and contribute to further arcing in the event of a subsequent protective circuit breaking operation.

The present invention applies conductive polymers to the environment of a protective circuit breaking contactor. Certain polymers have a relatively low electrical resistance when the current through the polymer is low, and when the current increases to a high level, such polymers change state very rapidly on the molecular level, and exhibit a very high electrical resistance. The high resistance state may be tens to hundreds of times greater than the nominal, low resistance state at the lower current level. This characteristic can be applied effectively to limit current passing through the polymer.

There is a need to protect loads and lines from damaging short-circuit currents, effectively and efficiently, and also to provide basic fault current protection. The combination controller according to the invention achieves this in a load controller having a relay for opening a circuit to a load, with a conductive polymer in series with the relay contacts. The electrical resistance of the conductive polymer increases substantially immediately upon application of a high load current level, thereby inserting protective electrical resistance in series with the load. This combination load controller protects the line and the load from high short-circuit currents, decreases arcing across the relay contacts, and more dependably operates to open the circuit between the line and the load.

SUMMARY OF THE INVENTION

It is an object of the invention to provide an improved protective contactor that couples and decouples an electrical power line and a load, characterized by minimal series resistance at rated current loading and greatly increased series resistance in the event of excessive current.

These and other objects are satisfied according to the invention in a load controller in a compact, easily installed housing with a switchable contactor including an electromagnet and a movable armature for opening and closing contacts in series between a line and a load. A conductive armature bar is movable by the armature to open or close a circuit between an input terminal and an output terminal. The input terminal is coupleable to a power line. The output terminal is coupleable to the load. The input terminal is electrically coupled to one side of a conductive polymer. An opposite side of the conductive polymer is electrically coupled to a conductive bus bar terminating in a first contactor terminal. A second contactor terminal is spaced from the first contactor terminal and is coupled to the output terminal. The armature bar on the movable armature is movable to close the circuit across the first and second contactor terminals, to conduct between the input terminal and the output terminal and thereby to couple power line current to the load. The movable armature can be spring biased into an open position, whereby energizing of the electromagnet overcomes the force of the spring bias to close the current path via the contactor bar. Alternatively, the contactor bar can be spring biased into a closed position wherein the contactor bar is in electrical contact with the first and second contactor terminals, and arranged such that energizing of the electromagnet overcomes the force of the spring bias to open the circuit.

The conductive polymer in series with the line and the load is of the type having a relatively low electrical resistance when the flow of current is relatively low, i.e., below a threshold value that is at least slightly higher than a rated current of the line or load. Conductive polymers of this type are known in the art and marketed by the company Raychem under the name Polyswitch™. When current drawn through the polymer increases above the threshold value, the internal temperature of the polymer increases due to resistance heating, causing a large increase in the polymer's electrical resistance and the series resistance of the circuit between the line and the load. The increase in resistance preferably is 1000 to 4000 times the polymer's nominal resistance value at low temperature (low current) conditions. The polymer remains in series with the line and load, but has only a nominal resistance unless heated by overcurrent conditions.

The invention includes a logic circuit to control the application of power to the electromagnet coil. The logic circuit preferably is responsive to means for sensing current and/or voltage of the line and load. Sensed current and/or voltage conditions, outside maximum and/or minimum threshold limits, triggers the logic circuit to energize or de-energize the electromagnet coils for opening the circuit between the line and the load, which are respectively coupled to the first and second contactor terminals. Preferably, the logic circuit is arranged such that an over-current or under-voltage condition, etc., must exist longer than a predetermined time period before the logic circuit triggers opening of the contactor.

When installed along a line between a power source and a load, the load controller of the invention provides a unique combination of short circuit protection and conventional overload protection. If a load circuit, including for example a motor, develops a short circuit, the circuit may draw a sufficiently large current to damage the motor or the conductors coupling the motor to the power line, due to resistive heating at high current and low series resistance. To avoid expensive damage, typical motor control circuits include a protective relay arranged to open a current path between the power line and the motor when over-current conditions are sensed. Typically, however, the relay does not open for a number of cycles at the power line AC frequency. Even if the protective relay opens relatively promptly, the magnitude of the current drawn by a short circuited motor for even a short time can destroy the motor and/or result in overheating which could damage nearby components or start a fire. However, in the load controller of the invention, a high current passing through the conductive polymer in series with the line and load also immediately causes the polymer to increase greatly in resistance, thereby limiting the short circuit current. The polymer's resistance increases quickly enough to avoid damage to the load and surrounding components. The increase in the resistance of the conductive polymer limits the current flowing to the motor to a value that is below a range in which damage to the load could occur. However, the current flowing to the motor remains higher than a nominal operating current flowing during normal motor operation. A current sensor coupled to the logic circuit senses the level of current supplied to the load and triggers the logic circuit if the current is sensed to be greater than a threshold value higher than the rated current of the line or load. The current logic circuit controls energizing of the electromagnet for opening the relay contacts. After sensing a number of cycles of high, fault current, the logic circuit energizes or de-energizes the electromagnet. Preferably, the logic circuit is arranged to power the electromagnet for drawing the armature toward the electromagnet coils and closing the contacts. Upon release of power, a biasing spring on the armature causes the armature to move away from the electromagnet, which is stationary, thereby moving the conductive armature bar out of position bridging across the first and second contactor terminals, and opening the circuit between the power source and load.

The logic circuit can include a voltage sensor for sensing the voltage drop across the conductive polymer. When nominal operating current flows across the polymer, the resistance of the polymer is relatively low and the voltage drop is minimal. A low voltage drop across the polymer thus signals that conditions are normal and that the contactor bar may remain in place to provide an electrical path through the contactor. The voltage sensor can include a threshold detector or similar switching circuit.

Excessively high current carried through the conductive polymer, such as in the case of a load short circuit or other catastrophic fault, produces a larger voltage drop across the conductive polymer. Moreover, resistive heating causes the conductive polymer to increase greatly in resistance, leading to a significant increase in the voltage drop across the polymer. A voltage drop above a predetermined threshold signals the logic circuit via the voltage sensor as a fault condition. If the excessive voltage drop persists, e.g., for a number of line cycles, the logic circuit switches off the power to the electromagnet coil, thereby breaking the circuit between the power source and the motor.

The resistance of the conductive polymer increases greatly almost immediately upon commencement of an excessive current such as caused by a short circuit. Although the load circuit may be directly shorted, current flow is limited by the conductive polymer, which in that case is coupled in parallel with the line. Due to such current limitation, arcing is less likely to occur when the contactor bar is separated from the contactor terminals. It is known that continued arcing between terminals will eventually interfere with the ability of the terminals to conduct electricity by contributing to pitting and carbon build-up on the terminals. That situation is prevented by the conductive polymer.

Only very high currents, such as those that result from a short circuited load, are sufficient to substantially increase the resistance of the conductive polymer, which has a nonlinear relationship of resistance to temperature, and therefore current. Currents that are slightly over nominal do not substantially affect the resistance of the conductive polymer.

Upon start-up of a heavy duty electric motor, the motor coils draw approximately six times the current drawn during normal, continuous operation. Preferably, the conductive polymer does not respond to this extent of overcurrent, which is expected in a load circuit of this type. Therefore, the presence of the conductive polymer in series with the line and the motor does not inhibit start-up by triggering the logic circuit to open the circuit. In the event of an overload, the motor or other load circuit may draw excess current, but not of the extreme magnitude of a direct short-circuit. In that event, the combination controller can open the circuit between the power line and the load by sensing the load current in known manner. Fault currents which are usually much less than short-circuit currents, are sensed by a current sensor coupled to the logic circuit, for example with a threshold detector as above. If the fault current persists longer than a given duration, the logic circuit de-energizes the stationary magnet releasing the armature bar to move away from the contactor terminals, and opening the circuit between the power line and the motor or other load. No increase in resistance of the conductive polymer occurs.

The load current can be sensed from the voltage drop across the conductive polymer. According to Ohm's Law (V=IR), an increase in current drawn by the motor across the conductive polymer causes an increase in the voltage drop across the polymer, even absent an increase in polymer resistance. The increase in voltage drop across the polymer is sensed by the voltage sensors of the logic circuit, which de-energizes the electromagnet magnet to open the circuit between the power line and the motor. Repairs presumably are then made to remedy the fault condition before recoupling the load to the line.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
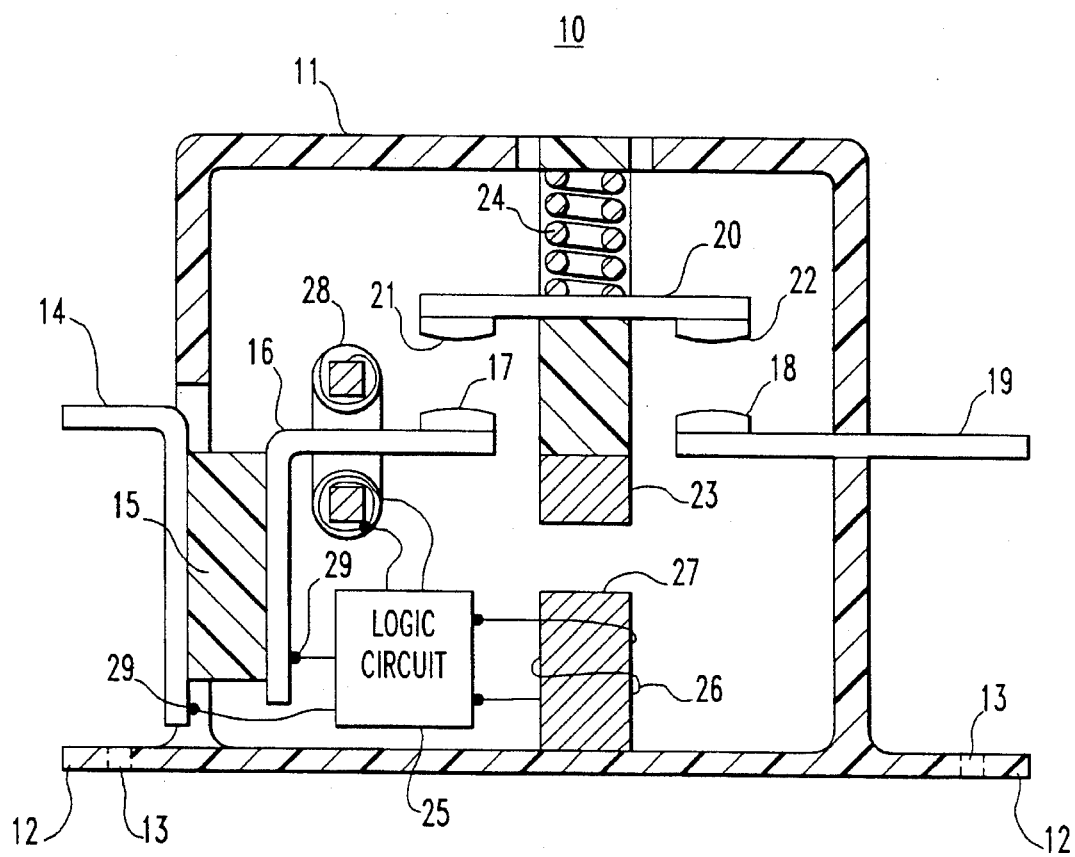
FIG. 1 is sectional view of a combination controller in accordance with the invention.

A combination electrical load controller 10 according to the invention, for providing short circuit and general overload protection for a motor or other type of load, is shown in FIG. 1. The controller 10 includes a housing 11 for protecting the internal controller components. Housing 11 is generally compact and easily mounted in a circuit between a power line and a load being controlled and/or protected. Housing 11 has flanges 12 provided with fastening apertures 13, and can be fastened to a preferably rigid structure such as the panel of a junction box, by use of fastening devices such as rivets or screws placed through fastening aperture 13. Housing 11 is constructed of plastic or comprises nonconductive material for isolating the conductors and avoiding grounding or shorting of the power line.

Controller 10 includes an input terminal 14 coupled to a load driving power source or line. Conductive polymer 15 is electrically coupled to input terminal 14. An opposite side of conductive polymer 15 is electrically coupled to bus bar 16. Bus bar 16 is preferably constructed of heavy gage copper or another suitable, high-current conductor. Bus bar 16 terminates in first contactor terminal 17. A second contactor terminal 18 is laterally spaced from the first contactor terminal 17. Second contactor terminal 18 is electrically coupled to output terminal 19. Output terminal 19 is coupled to a load, such as a motor. A return conductive path from the load is also required; however it is sufficient if only one of the two conductors coupling the line and load has a protective circuit breaking arrangement.

Armature bar 20 is conductive and has armature bar terminals 21 and 22 affixed at its opposite ends. Armature bar terminals 21 and 22 are aligned with first contactor terminal 17 and second contactor terminal 18, respectively. Armature bar 20 is fixed to movable armature 23, which is biased by armature spring 24 into an open circuit position where armature bar terminals 21 and 22 are spaced from first contactor terminal 17 and second contactor terminal 18, respectively.

Logic circuit 25 controls energizing of coil 26, wound on a stationary magnet or ferromagnetic body 27, forming an electromagnet. For coupling power to a load through the device, logic circuit 25 is controlled, such as by switching means (not shown), to energize coil 26. The magnetic flux induced by energizing coil 26 attracts movable armature 23 downwardly toward stationary magnet or body 27. The force of attraction caused by the induced magnetic field overcomes the opposing biasing force of armature spring 24. When movable armature 23 moves downwardly, armature bar terminals 21 and 22 contact first contactor terminals 17 and second contactor terminal 18, respectively, thereby closing the circuit between input terminal 14 and output terminal 19.

Logic circuit 25 includes current sensors 28 and/or voltage sensors 29. Current sensors 28 and voltage sensors 29 are electrically coupled to logic circuit 25, which controls energization/de-energization of coil 26. In the event of excessive current being sensed by the logic circuit via current sensors 28, or via the voltage drop across the variable resistance polymer 15, sensed by voltage sensors 29, the logic circuit is triggered to open the contacts. For example, logic circuit 25 de-energizes coil 26 if a fault overload current above a selectable threshold persists longer than a selectable time period. Similarly logic circuit 25 de-energizes coil 26 to open the circuit between input terminal 14 and output 19 if the line voltage goes out of predetermined limits. The logic circuit can be arranged to respond to excessive short term current level at a high threshold level, and to excessive long term current at a threshold that is somewhat lower. Preferably, the logic circuit also responds to line voltage above or below high and low voltage thresholds as well.

In normal operation, logic circuit 25 energizes coil 26, drawing movable armature 23 downward to bridge across first contactor terminals 17 and 18, respectively, thereby closing a current path between input terminal 14 and output terminal 19. Current flows through terminal 14, conductive polymer 15, bus bar 16, armature bar 20 and output terminal 19, to the load, such as a motor. Whereas the normal resistance of the conductive polymer is relatively low, current flow is not substantially impeded even though the conductive polymer is in series with the load and line. Conductor polymer 15 is of the type that changes state rapidly into a state of high resistance when conducting a relatively high current, i.e. one above a selectable threshold level. The dimensions and type of particular conductive polymer is selected based on the rated operating current of the load, i.e., the conductive polymer is large enough that in normal operation the magnitude of current is below a threshold level that would cause the conductive polymer to change to its high resistance state due to heating.

Figure 2:
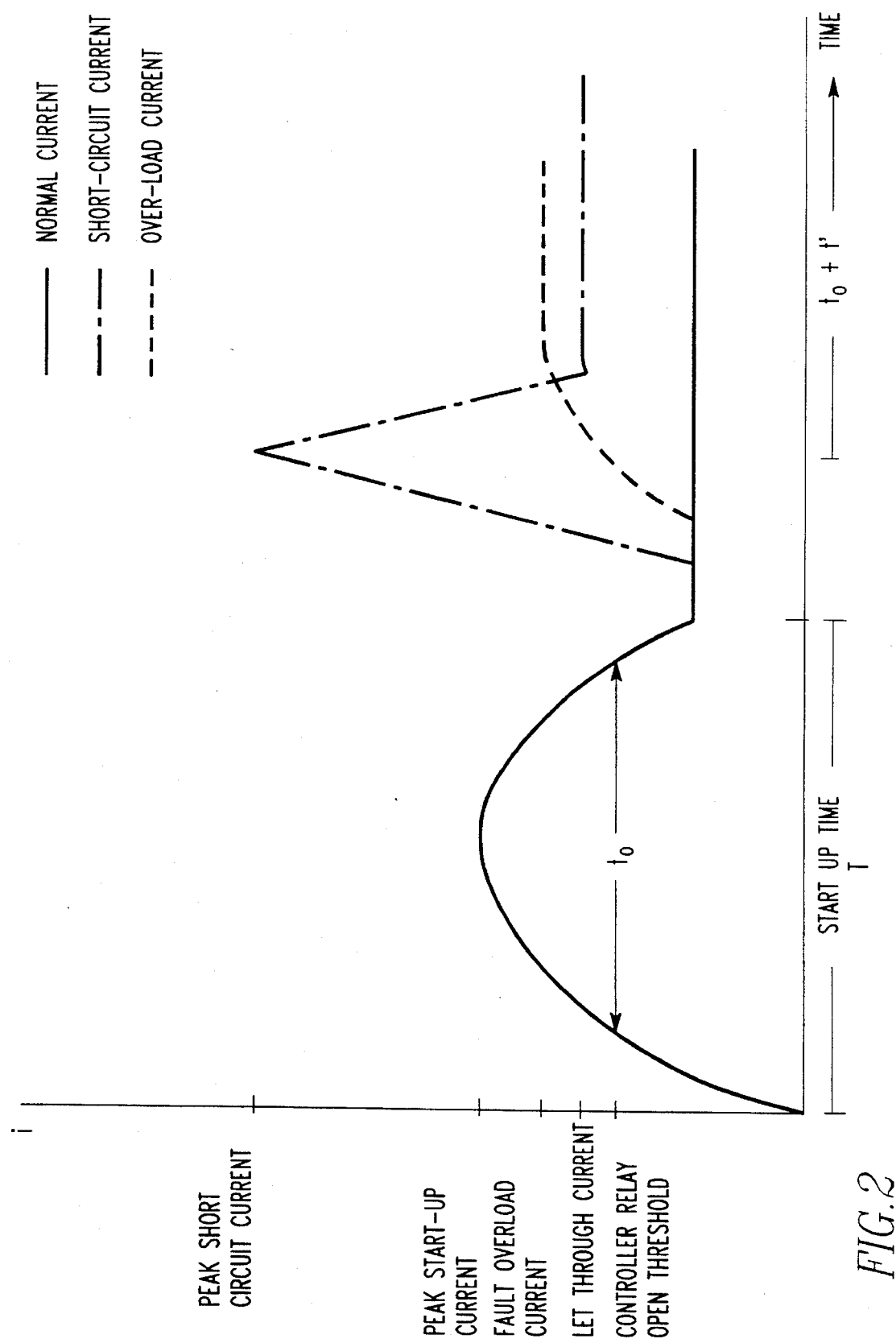
FIG. 2 is a current vs. time graph showing various currents associated with the controller.

FIG. 2 is a graph showing current flow through controller 10. The solid line depicts normal current flow. For example, upon start-up the load (e.g., a motor) draws a higher current than normal until the load stabilizes in steady-state operation. As shown on FIG. 2, the start-up current lasts for a time T. The start-up current drawn by the load through controller 10 includes a portion which is significantly higher than a controller relay open threshold value. However, the start-up current in excess of the controller relay opening threshold lasts for a duration which is shorter than an allotted start-up time built into logic circuit 25, for example via an RC timing arrangement, the timing operation of a processor or similar logic circuit, or the like. For example, the relatively high currents drawn by the load during start-up and sensed by current sensor 28 or voltage sensor 29 last for time $T_o$. Time $T_o$ is less than the threshold time of logic circuit 25 which would trigger logic circuit 25 to de-energize coil 26 and open the circuit between input terminal 14 and output terminal 19. When the load stabilizes, the current drawn by the load levels off at a value less than the controller relay open threshold current. The maximum current drawn by the load on start-up, i.e. the peak start-up current is less than a value which would trigger conductive polymer 15 to change into a high resistance state.

The controller of the invention provides a unique combination of protection from both short-circuit and overload (fault) currents, and can also respond to undervoltage conditions and the like. Assuming that a short-circuit develops in the load or in conductors leading between the controller and the load the load may draw very excessive current. Such an occurrence is illustrated by the dashed lines in FIG. 2. The short circuit current quickly climbs to a magnitude sufficient to trigger conductive polymer 15 to switch into its high resistance state. Conductive polymer 15 changes to its high resistance state quickly enough to avoid major damage to the load, the conductors and any surrounding components due to the substantial current, for even a relatively short time period. The switch of the conductive polymer 15 to its high resistance state inserts additional series resistance into the line and thereby impedes current flow through controller 10. The short circuit current is substantially limited by the high resistance of conductive polymer 15 to a relatively safe level. Although the change of state of conductive polymer 15 to its high resistance state limits the short-circuit current to an acceptable level, the limited short circuit current remains above the controller relay open threshold current programmed into logic circuit 25. Once the limited short-circuit current persists for a period of time over a specified threshold limit, such as for time $t_o+t'$, logic circuit 25 de-energizes coil 26 whereupon biasing armature spring 24 lifts the movable armature 23 upwardly. Armature bar 20, affixed to movable armature 23, likewise moves upwardly, breaking contact between armature bar terminals 21 and 22 and first contactor terminal 17 and second contactor terminal 18, respectively, and removing the conductor otherwise bridging between them. The opening of the current path between input 14 and output terminal 19 cuts power to the load. Tripping of the contactor is preferably indicated visually, e.g. by the position of armature 23. The contactor remains open until reset, and an engineer or technician readily can investigate the source of the short circuit condition in safety, because the load is decoupled from the line.

The opening of the current path prevents even limited-short circuit current from flowing through the contactor. Prior to tripping of the contactor, however, the conductive polymer 15 limits the short-circuit current to a lower level by changing into its high resistance state. Continued application of even the limited short-circuit current to the load for an extended length of time could cause damage to the load or to surrounding components. Therefore, the logic circuit opens the circuit when the voltage drop across the conductive polymer or the current as otherwise sensed, remains above a maximum threshold for a predetermined time.

The load may draw an excessive amount of current due to overloading or the like, at a level that is less than the magnitude of current which would be drawn in case of a short circuit. Where the load is a motor driving a mechanical load, the mechanical load on the motor could be such that it is over driven and draws excessive current, leading to overheating. An illustration of such a case is shown by the dotted lines of FIG. 2.

The overload current drawn by the motor rises above the current relay open threshold, but is much less than a level which would cause switching of conductive polymer 15 into a high resistance state. If the overload current drawn by the motor persists greater than a threshold time period, such as $t_o+t'$, the over-load current sensed by current sensor 28 of logic circuit 25 will trigger de-energization of coil 26° De-energization of coil 26 opens the current path between input terminal 14 and output terminal 19. The motor or load will be shut down, whereupon an engineer or technician can investigate the nature of the fault.

As noted above, logic circuit 25 can be provided with voltage sensor 29 in conjunction with current sensors 28, or preferably, in lieu of current sensor 28. Voltage sensors 29 sense a voltage drop across conductive polymer 15. A change in the voltage drop across conductive polymer 15 is recognized by logic circuit 25 as an out-of-specification condition in a manner analogous to sensing of over-current by current sensor 28. For example, during normal operation, a voltage is developed across conductive polymer 15 in accordance with the equation $V=IR$. At start-up, it is known that a start-up current is drawn which can be up to six times higher than the steady state operating current drawn by a load, such as a motor. The high start-up current causes a corresponding relatively high voltage drop across conductive polymer 15. The current drawn during start-up is less than an amount that would cause conductive polymer 15 to switch into a high resistance state, therefore, the value of resistance of the conductive polymer is the same during start-up as it is during normal steady-state operation. The increase in the voltage drop across conductive polymer 15 during start-up lasts for a relatively short duration. The increase in voltage during start-up lasts for less than a threshold time which has been programmed into logic circuit 25. Therefore, logic circuit 25 does not de-energize coil 26 in response to the relatively short duration of relatively high voltage drop across conductive polymer 15, during start-up.

At the onset of a short-circuit, conductive polymer 15 switches into a high resistance state to impede the flow of current through controller 10. The increase in resistance results in a substantial increase in the voltage drop across conductive polymer 15, which adds to the voltage drop due to the current level. Provided the increase in voltage drop across conductive polymer 15 persists for an extended period of time, i.e. longer than a predetermined minimum time period programmed into logic circuit 25 or determined by its switching circuitry, logic circuit 25 de-energizes coil 26, opening the circuit between input terminal 14 and output terminal 19.

An increase in current due to an overload or fault condition, which current is not of the magnitude of a short-circuit current, causes a corresponding increase in voltage drop across conductive polymer 15 in accordance with the formula $V=IR$. Once again, if the increased voltage sensed by voltage sensors 29 persists for a sufficiently long duration, logic circuit 25 de-energizes coils 26 causing opening of the circuit between input terminal 14 and output terminal 19. However, such an increase in current is not sufficient to substantially increase the resistance of the conductive polymer.

The controller of the invention, therefore, provides a combination of short circuit protection, provided by the conductive polymer and conventional overload protection, provided by a switchable electromagnetic relay, in conjunction with a controlling logic circuit.

The invention, having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples to assess the scope of the invention in which exclusive rights are claimed.

What I claim is:

1. An electrical load controller; comprising:
   a first input means coupleable to a power line;
   a first output means, coupleable to a load;
   protective switch means coupled between the first input means and the first output means for decoupling the load from said power line;
   a conductive polymer coupled between said first input means and first output means such that all current from said power line to said load passes through the conductive polymer when the protective switch means is closed, said polymer exhibiting a first lower electrical resistance when conducting expected load currents, said electrical resistance of the polymer rapidly increasing to a second, higher resistance upon application of a short circuit current that is higher than the expected load currents, whereby the conductive polymer limits current to the load by inserting said higher resistance in series with the load during overcurrent conditions characteristic of a short circuit.

2. The controller of claim 1, further comprising current sensing means and switch control means coupled to trigger said protective switch means to open when said current sensing means senses a current having a magnitude over a predetermined current threshold level greater than normal currents but less than said short circuit current for a continuous time period longer than a predetermined time duration.

3. The controller of claim 1 wherein said protective switch means includes a first contact means, a second contact means movable into contact with said first contact means, a stationary electromagnet means with a winding and a movable armature means affixed to said second contact means, the electromagnet means being responsive to the current sensing means for causing a contact closing stroke which moves said second contact means into contact with said first contact means.

4. The controller of claim 3, wherein said switch control means includes logic means coupled to said current sensing means, said logic means being operable for triggering movement of said second contact means out of contact with said first contact means to decouple power from the load.

5. The controller of claim 4, wherein said logic means de-energizes said winding means for causing movement of said second contact means out of contact with said first contact means to decouple power from the load.

6. The controller of claim 4 wherein said logic means energizes said winding means for causing movement of said second contact means out of contact with said first contact means to decouple power from the load.

7. The controller of claim 1, further comprising voltage sensing means and switch control means for opening said protective switch means when said voltage sensing means senses a voltage having a magnitude outside at least one predetermined voltage threshold level for a continuous time period longer than a selectable time duration.

8. The controller of claim 7 wherein said voltage sensing means includes a pair of voltage sensors coupled on opposite sides of a current path defined by a length of said conductive polymer, whereby the voltage sensing means is responsive to a voltage drop across the conductive polymer.

9. The controller of claim 8 wherein said protective switch means includes a first contact means, a second contact means movable into contact with said first contact means, a stationary electromagnetic means with winding means and movable armature means affixed to said second contact means and causing a contact closing stroke which moves said second contact means into contact with said first contact means.

10. The controller of claim 9 wherein said switch control means includes logic coupled to said voltage sensing means, said logic having means for triggering movement of said second contact means out of contact with said first contact means to decouple power from the load.

11. The controller of claim 10 wherein said logic means de-energizes said winding means for causing movement of said second contact means out of contact with said first contact means to decouple power from the load.

12. The controller of claim 10 wherein said logic means energizes said winding means for causing movement of said second contact means into a disposition of electrical discontinuity with said first contact means to decouple power from the load.

13. A power controller comprising:
a power input terminal, coupleable to a power line;
a power output terminal, coupleable to a load; and
current limiting means comprising a conductive polymer in series with the power input terminal and the power output terminal, the conducting polymer being variable in resistance as a function of current, thereby limiting current from said power input terminal to said power output terminal, said conductive polymer having a first, relatively lower electrical resistance when conducting a first, relatively lower current, and a second, relatively higher resistance when conducting a second, relatively higher current, said conductive polymer rapidly changing in resistance upon commencement of the relatively higher current, to protect the load from damage caused by excessive current, voltage sensing means coupled to the conductive polymer, for determining a voltage drop across the conductive polymer, and switch means responsive to the voltage sensing means, the switch means opening a conductive path between said power input terminal and power output terminal in response to the voltage drop exceeding a predetermined magnitude when said conductive polymer conducts said second, relatively higher current for longer than a predetermined time.

14. The power controller of claim 13, further comprising a current sensing means opening said switch means in response to sensing of a current having a magnitude above a selectable threshold current level for a predetermined time period.

* * * * *